Dec. 27, 1960   B. R. COLE ET AL   2,966,586
EMERGENCE SIGNAL DETECTOR PULSE-FORMING MEANS
Filed Feb. 3, 1959
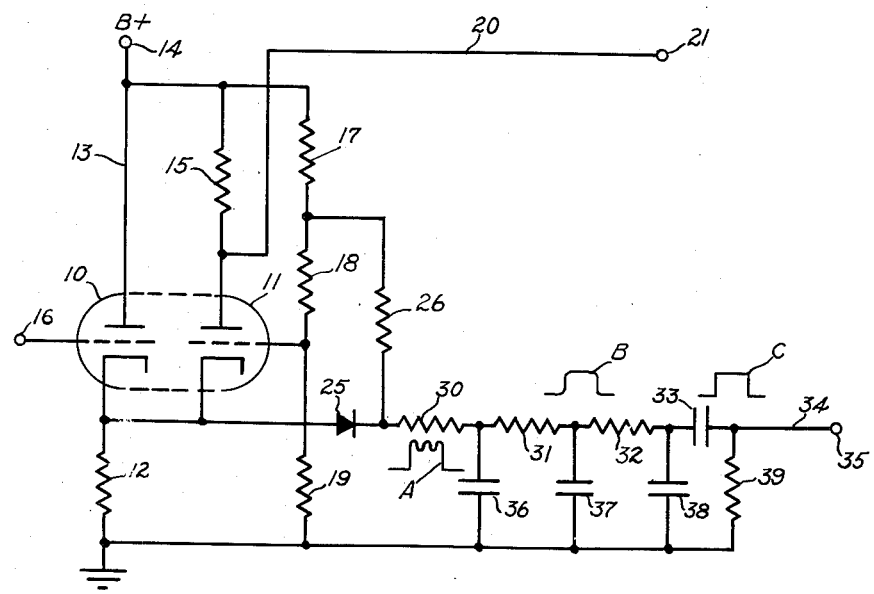
INVENTOR.
BENJAMIN R. COLE
EDWARD J. SHELDON, JR
BY
H. H. Losche
ATTORNEYS

United States Patent Office 2,966,586
Patented Dec. 27, 1960

2,966,586

EMERGENCE SIGNAL DETECTOR PULSE-FORMING MEANS

Benjamin R. Cole, Arlington, and Edward J. Sheldon, Jr., Lexington, Mass., assignors, by mesne assignments, to the United States of America as represented by the Secretary of the Navy Filed Feb. 3, 1959, Ser. No. 790,985

3 Claims. (Cl. 329—126)

This invention relates to peak detection and pulse-forming means for selecting the high amplitude voltage swings of a frequency modulated voltage envelope and for filtering and forming the peak detected voltages into small substantial square waves, and more particularly this invention relates to means detecting the emergent high amplitude Doppler voltage swings produced by the emergence of a projectile or missile into the atmosphere and the pulse forming of the detected emergent signal.

In instances primarily utilizing Doppler frequencies for radar chronograph measurement, it is helpful to utilize the initial or emergence voltage swing of the received Doppler frequency as a base or initial point of time for timing related circuitry. In one physical application in which the present invention is very useful a Doppler frequency is produced in a Doppler radar chronograph for the calculation of the velocity of projectiles in which the initial Doppler frequency voltage swing identifies the burst or emergence of each projectile into the atmosphere. Such a Doppler frequency envelope consequently will consist of an initial large voltage swing in the envelope which may be used in this invention for developing a substantially small square voltage wave capable of timing all circuits of the chronograph.

In this invention, using Doppler envelopes of Doppler radars as an example, the Doppler frequency voltage envelope is applied to the grid of a cathode follower vacuum tube which forms the first stage of a cathode-coupled dual triode Doppler amplifier for amplifying the Doppler frequency for velocity measurements in downstream circuitry of a velocity meter. The cathode of the cathode follower is coupled through a crystal diode detector having its cathode biased by a positive voltage source of an amplitude slightly below the positive voltage amplitude of the Doppler burst or emergence voltage signal. The cathode of the cathode follower being of a low impedance and the cathode bias on the crystal diode being of a high impedance provide a peak detector for detecting the positive peak voltages of the Doppler voltage envelopes. The peak detector is coupled to a filter and pulse-forming circuit of a plurality of stages of resistances and capacitances coupled in series-parallel relation to filter out Doppler frequency ripples and form a substantially square wave of the peak detected Doppler voltage envelope. While this invention is particularly adaptable for use with a Doppler radar chronograph, it is to be understood that the invention has many uses in companion circuitry where peak detection and wave forming are essential in accomplishing desirable results. It is therefore a general object of this invention to provide a means for detecting the peak voltages of frequency modulated voltage envelopes and forming each said peak voltage into a substantial square wave on which time may be based for an initial starting point in each sequence of events.

These and other objects, advantages, features, and uses may become more apparent to those of ordinary skill in the art when considered together with the description and drawing, the drawing of which illustrates one preferred embodiment of the invention in circuit schematic diagram.

Referring more particularly to the drawing, two triode vacuum tubes or a double-triode vacuum tube, referred to herein by triode tube section 10 and triode tube section 11, are cathode-coupled through a common cathode resistance 12 to ground. The anode of the triode tube section 10 is coupled through a conductor 13 directly to a B+ anode voltage supply source adapted to be connected to the terminal 14. The anode of the triode tube section 11 is coupled through an anode resistor 15 to the B+ anode voltage source at 14. The triode tube section 10 constitutes a cathode follower and has its grid coupled to an input terminal 16 which may have frequency modulated voltage envelopes applied thereto in irregular or damped envelope form. The grid of the triode tube section 11 is coupled to a voltage divider circuit consisting of resistors 17, 18, and 19 between the anode voltage supply 14 and ground at the junction of the resistors 18 and 19. The anode of the triode tube section 11 is coupled through a conductor means 20 to a terminal point 21 which may be coupled to subsequent stages of amplification.

A crystal rectifier 25 has its anode coupled directly to the common cathode coupling and its cathode coupled through a resistance 26 to the junction of resistors 17 and 18 in the voltage divider network to provide a high impedance establishing a threshold voltage for the crystal rectifier 25. The cathodes of the double triode tube sections 10 and 11 being of low impedance will impress the cathode voltage on the anode of the crystal rectifier 25, which rectifier will pass voltage of an amplitude becoming greater than the threshold voltage established by the voltage divider network 17 to 19 and the resistor 26. Crystal rectifier 25, with its threshold bias through resistor 26, provides a peak detector network for variable cathode positive voltage appearing on the double triode tube circuits 10 and 11.

The cathode of the crystal rectifier 25 is coupled serially through resistors 30, 31, and 32 and a capacitor 33 and by way of an output conductor 34 to an output terminal 35. Series-paralleling the resistors 30 to 32 to ground are capacitors 36, 37, and 38, these capacitors being in parallel with resistor 39. This resistor-capacitor network constitutes a filter circuit for filtering out any modulated frequency appearing on any peak detected voltage wave passed by the crystal rectifier 25 and for shaping this peak detected voltage wave into a substantially small square wave voltage corresponding in time to each peak detected voltage wave. The terminal 35 may be coupled, for example, to circuitry of a velocity meter for initially timing velocity measurements.

In the operation of the above-described invention let it be assumed that voltage envelopes having frequencies superimposed thereon are applied to the terminal 16 or the grid of the cathode follower tube section 10 of this circuit. The cathode of the cathode follower tube section 10 will follow the grid as a cathode follower amplifier, which cathode voltage is amplified in the triode tube section 11 to provide amplification of this voltage on the output 20 to the output terminal 21 for utilization in subsequent amplifier or other circuits. For the purpose of an example in which the invention is particularly applicable, let it be assumed that the voltage envelopes applied to the input terminal are Doppler envelopes of Doppler frequency being received from traveling objects of which velocity measurements are to be made. Let it be assumed further for the purpose of this example that these velocity measurements are to be made of objects, such as projectiles or missiles, in which the applied Doppler envelopes will be created with an initial large voltage swing representing the emergence or burst of the object projectile or missile into the atmosphere.

While these specific examples of the applied voltage envelopes are cited to give vitality to a complete understanding of this invention, it is to be understood that other voltage envelopes in which it is desired to amplify such voltage envelope signals and to detect envelope portions of high amplitude may be applied to this circuitry with equal facility. The initial burst or emergence voltage swing will be created on the cathode of the cathode follower and thereby applied to the crystal detector 25, the peak amplitude of which will be passed thereby since the crystal detector network is designed to have a threshold supply voltage slightly below this peak voltage to provide a peak detector. The peak voltage is passed to the filter and pulse-forming circuit to provide pulses as shown by A, B, and C along the filter and pulse-forming circuitry 30 to 39, inclusive. As may be seen by the pulse waveform A, a ripple occurs on the top portion of this waveform, indicating the presence of Doppler frequency. These ripples are filtered out as the voltage wave passes through the filter circuit to provide the waveform B, which is thereafter formed or shaped to provide a substantially small square wave voltage C. Such a waveform C corresponds to each object emergence establishing an initial time base from which all future velocity measurements of the emerged object may be made. Likewise, the amplified Doppler frequency taken from the output terminal 21 may be utilized in the velocity measurements in accordance with time measurements made from the time voltage signal C.

While many modifications and changes may be made in the constructional details and values of the circuit components illustrated herein to adapt this circuit for other uses of time-velocity measurements of various objects or purely for the purpose of analysis of voltage envelopes, it is to be understood that we desire to be limited only by the scope of the appended claims.

We claim:

1. Means forming small substantially square voltage pulses from large swing modulated voltage envelopes comprising: a two-triode cathode-coupled amplifier, the grid of the first triode coupled to receive large swing voltage envelopes and the grid of the second triode being coupled to a fixed point in a voltage divider to provide a fixed voltage bias; a peak detector coupled to said cathods and cathode voltage biased from a point in said voltage divider to provide a threshold voltage to pass the peaks of voltage envelopes produced on said cathodes; pulse forming and filter means coupled to receive the voltage peaks passed by said peak detector for filtering out modulation frequencies superimposed on said voltage peaks and for forming substantially square wave voltages corresponding respectively in time to said large swing voltage envelopes; and an output coupled to the anode of said second triode for transmitting amplified frequencies of the voltage envelopes whereby amplified modulation frequencies and small substantially square wave voltages are produced for utilization circuits.

2. A means as set forth in claim 1 wherein said peak detector is a crystal diode having its anode coupled to said cathodes and its cathode coupled to said voltage divider bias and to said pulse forming and filter means.

3. A means as set forth in claim 1 wherein said two-triode cathode-coupled amplifier is constructed and arranged to receive positive voltage envelopes and said peak detector is a crystal diode having its anode coupled to said cathodes and its cathode coupled to a positive voltage in said voltage divider to bias same and to said pulse forming and filter means whereby said small substantially square wave voltages are positive.

References Cited in the file of this patent

UNITED STATES PATENTS

| 2,276,565 | Crosby | Mar. 17, 1942 |
| 2,922,877 | Gaunt | Jan. 26, 1960 |

FOREIGN PATENTS

| 79,447 | Netherland | Oct. 15, 1955 |
| 160,448 | Australia | Jan. 6, 1955 |
| 530,091 | Belgium | Jan. 3, 1955 |